(12) United States Patent
Jeon et al.

(10) Patent No.: US 12,269,493 B2
(45) Date of Patent: Apr. 8, 2025

(54) VEHICULAR DRIVING CONTROL SYSTEM AND METHOD FOR PERFORMING A PREDICTIVE GEAR-SHIFTING FAILURE STATUS DIAGNOSIS

(71) Applicants: Hyundai Motor Company, Seoul (KR); Kia Corporation, Seoul (KR)

(72) Inventors: Byeong Wook Jeon, Whasung-si (KR); Min Jae Chai, Whasung-si (KR); Yong Uk Shin, Whasung-si (KR); Dong Hoon Jeong, Whasung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 429 days.

(21) Appl. No.: 17/490,674

(22) Filed: Sep. 30, 2021

(65) Prior Publication Data

US 2022/0388526 A1    Dec. 8, 2022

(30) Foreign Application Priority Data

Jun. 2, 2021    (KR) .......................... 10-2021-0071775

(51) Int. Cl.
*B60W 10/10*    (2012.01)
*B60W 30/19*    (2012.01)
(Continued)

(52) U.S. Cl.
CPC ............ *B60W 50/12* (2013.01); *B60W 30/19* (2013.01); *G07C 5/0808* (2013.01);
(Continued)

(58) Field of Classification Search
CPC .. B60W 50/12; B60W 30/19; B60W 2510/10; B60W 2520/105; B60W 2520/125; B60W 2552/15; B60W 2552/30; B60W 2710/10; B60W 50/0205; B60W 10/10; B60W 40/06; B60W 2050/0095;
(Continued)

(56) References Cited

U.S. PATENT DOCUMENTS

| 6,099,424 A | * | 8/2000 | Tsai ...................... F16H 61/662 |
|---|---|---|---|
| | | | 474/18 |
| 2012/0083977 A1 | * | 4/2012 | Tanaka .............. F16H 61/66259 |
| | | | 701/55 |

(Continued)

FOREIGN PATENT DOCUMENTS

| CN | 213323070 U | * | 6/2021 | |
|---|---|---|---|---|
| EP | 2322903 A1 | | 5/2011 | ............ B60T 8/1755 |
| JP | 2014010143 A | * | 1/2014 | |

*Primary Examiner* — Jelani A Smith
*Assistant Examiner* — George A Alcorn, III
(74) *Attorney, Agent, or Firm* — Morgan, Lewis & Bockius LLP

(57) ABSTRACT

A vehicular driving control system and a method for operating the same are provided, may include an information provider to provide information on a front road of a vehicle, a transmission controller to control gear shifting by predicting a condition on the front road based on the information on the front road, and a diagnosing device to diagnose a failure status by comparing the information on the front road with real front road information measured by a sensor, and to restrict a predictive gear-shifting controlling operation of the transmission controller, according to a result of the diagnosing.

17 Claims, 12 Drawing Sheets

(51) Int. Cl.
  *B60W 40/06* (2012.01)
  *B60W 50/12* (2012.01)
  *F16H 59/66* (2006.01)
  *F16H 61/12* (2010.01)
  *G07C 5/08* (2006.01)

(52) U.S. Cl.
  CPC ....... *G07C 5/0816* (2013.01); *B60W 2510/10* (2013.01); *B60W 2520/105* (2013.01); *B60W 2520/125* (2013.01); *B60W 2552/15* (2020.02); *B60W 2552/30* (2020.02)

(58) Field of Classification Search
  CPC ........ B60W 2050/021; B60W 2520/10; G07C 5/0808; G07C 5/0816; F16H 59/66; F16H 61/12; F16H 2059/663; F16H 2059/666; F16H 2061/1208; F16H 2061/1244; F16H 2061/1284; B60Y 2306/15
  USPC .......................................................... 701/1
  See application file for complete search history.

(56) References Cited

U.S. PATENT DOCUMENTS

2019/0266813 A1\* 8/2019 Jeon ..................... G07C 5/0841
2021/0301940 A1\* 9/2021 Fontaine ............ G05B 23/0235

\* cited by examiner

VEHICULAR DRIVING CONTROL SYSTEM AND METHOD FOR PERFORMING A PREDICTIVE GEAR-SHIFTING FAILURE STATUS DIAGNOSIS

CROSS-REFERENCE TO RELATED APPLICATION

The present application claims priority to Korean Patent Application No. 10-2021-0071775, filed on Jun. 2, 2021, the entire contents of which is incorporated herein for all purposes by this reference.

BACKGROUND OF THE INVENTION

Field of the Invention

The present invention relates to a vehicular driving control system configured for performing a predictive gear-shifting controlling operation in connection with an information provider, and a method for operating the same.

Description of Related Art

Various driving-related systems (for example, an engine, a transmission, a steering wheel, or a suspension) control the driving of a vehicle through a linkage with an information provider, such as a navigation based on a global positioning system (GPS). The driving-related system predicts the condition of a road (front road) in front of the vehicle by utilizing information on the front road, which is received from the information provider, and controls the driving of the vehicle by considering the information on the front road.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicular driving control system configured for controlling the operation of a front predictive gear-shifting function by verifying the matching with information provided by an information provider, when a predictive gear-shifting controlling operation is performed in connection with the information provider, and a method for operating the same.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a vehicular driving control system includes an information provider to provide information on a front road of a vehicle, a transmission controller to control gear shifting by predicting a condition on the front road based on the information on the front road, and a diagnosing device to diagnose a failure status by verifying matching with the information on the front road, and to restrict a predictive gear-shifting controlling operation of the transmission controller, according to a result of the diagnosing.

The information on the front road includes at least one of a moving distance per unit time, a slope of the front road, and a curvature of the front road.

The diagnosing device is configured to determine an information difference between predicted front road information based on the information on the front road and real front road information measured by a sensor, determines a failure status as being caused when the information difference is equal to or greater than a first threshold value, and determines valid failure as being caused, when the failure status persists for a first reference time or more than the first reference time.

The sensor includes at least one of a vehicle sensor, a longitudinal acceleration sensor, and a lateral acceleration sensor.

The diagnosing device is configured to instruct the transmission controller to stop the predictive gear-shifting controlling operation, when the valid failure is determined as being caused.

The diagnosing device is configured to determine a failure level according to the information difference and a time in which the failure status persists.

The diagnosing device is configured to increase a failure count whenever the failure level is determined.

The diagnosing device is configured to increase the failure count based on an adding count set depending on the failure level.

The diagnosing device is configured to determine the predictive gear-shifting controlling operation to stop from a time point, at which failure is finally caused, till start off, when the failure count reaches a preset threshold value.

The diagnosing device is configured to determine the vehicular driving control system as being in a normally returning status when the information difference is equal to or less than a second threshold value, determines the vehicular driving control system as being normally returned when the normally returning status maintains for a second reference time or more than the second reference time, and determines that the predictive gear-shifting controlling operation is allowed to be resumed, when the vehicular driving control system is determined as being normally returned.

The second reference time is set variously based on the failure count.

According to various aspects of the present invention provide a method for operating a vehicular driving control system includes controlling gear shifting by predicting a condition on a front road based on information on the front road, which is provided from an information provider, diagnosing, by a diagnosing device, a failure status by verifying matching with the information on the front road, and restricting a predictive gear-shifting controlling operation of the transmission controller, according to a result of the diagnosing.

The information on the front road includes at least one of a moving distance per unit time, a slope of the front road, and a curvature of the front road.

The diagnosing of the failure status includes determining an information difference between predicted front road information based on the information on the front road and real front road information measured by a sensor, determining a failure status as being caused, when the information difference is equal to or greater than a first threshold value, and determining valid failure as being caused, when the failure status persists for a first reference time or more than the first reference time.

The diagnosing of the failure status further includes determining a failure level according to the information difference and a time in which the failure status persists.

The diagnosing of the failure status further includes setting an adding count variously depending on the failure level, and increasing a failure count based on the adding count when the valid failure is determined.

The diagnosing of the failure status includes determining a time for determining returning, based on the failure count.

The operating method further includes determining the vehicular driving control system as being in a normally returning status when the information difference is equal to or greater than a second threshold value after the failure is diagnosed, determining the vehicular driving control system as being normally returned when the normally returning status maintains for a second reference time or more than the second reference time.

The operating method further includes determining that the predictive gear-shifting controlling operation is allowed to be resumed, when the vehicular driving control system is determined as being normally returned.

The restricting of the predictive gear-shifting controlling operation includes instructing the transmission controller to stop the predictive gear-shifting controlling operation when failure is diagnosed, and allowing the transmission controller to switch a gear shifting control mode from a prediction control mode to an automatic control mode.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
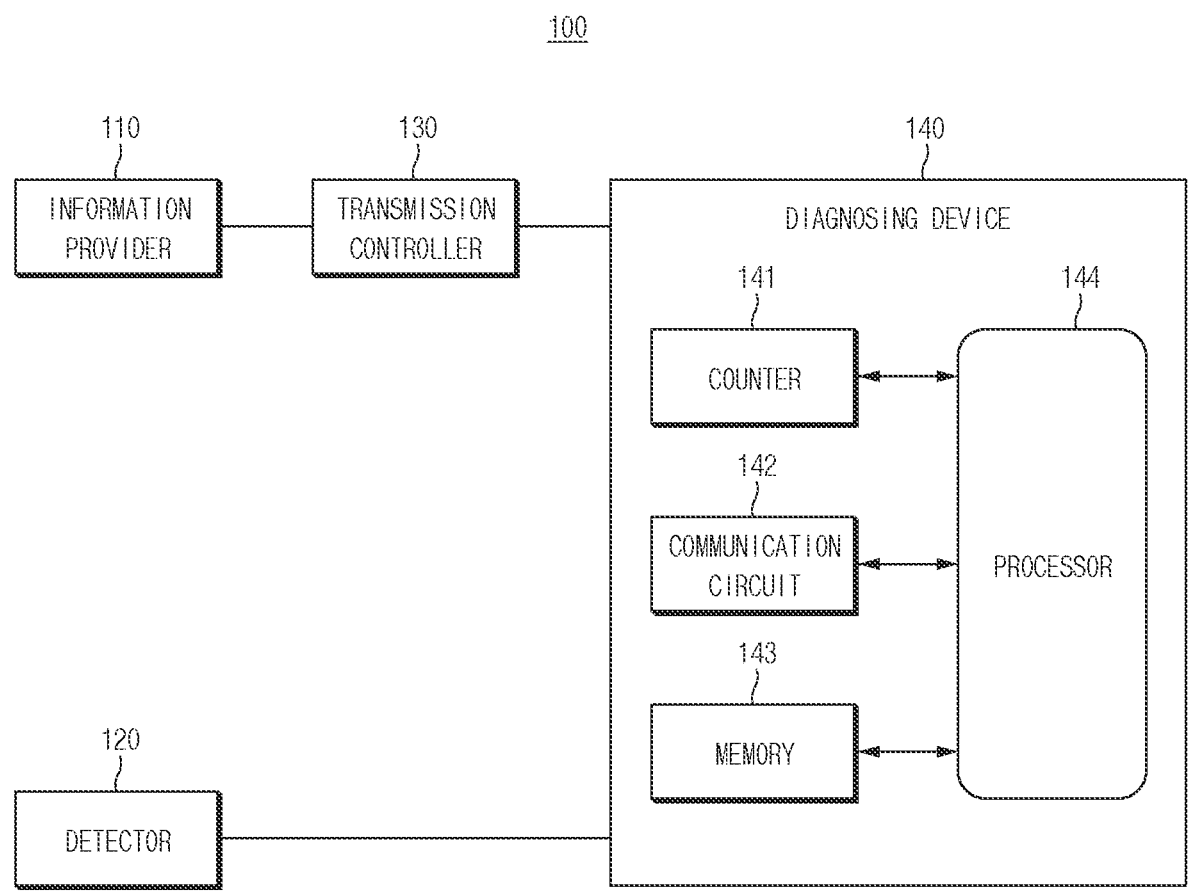
FIG. 1 is a block diagram illustrating a vehicular driving control system, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to accompanying drawings. In adding the reference numerals to the components of each drawing, it should be noted that the identical or equivalent component is designated by the identical numeral even when they are displayed on other drawings. Furthermore, in the following description of various exemplary embodiments of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", "(a)", "(b)", and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicular driving control system, according to various exemplary embodiments of the present invention.

Referring to FIG. 1, a vehicular driving control system 100 may include an information provider 110 connected through a vehicle network, a detector 120, a transmission controller 130, and a diagnosing device 140. The vehicle network may be implemented with at least one of a Controller Area Network (CAN), Media Oriented Systems Transport (MOST) network, a Local Interconnect Network (LIN), Ethernet, or X-by-Wire (Flexray) communication technology.

The information provider 110 may provide information on a map based on a current position, a forward direction and/or a set route of a vehicle, and/or information on a road (front road) in front of the vehicle based on the forward direction of the vehicle. The information on the front road may include information (data) on a moving distance per unit time, the slope of the front road and/or the curvature of the front road. The moving distance per unit time may be a moving distance per one second, which is determined through a global positioning system (GPS). The slope of the front road and the curvature of the front road may be the slope of the front road and the curvature of the front road at a specific position, for example, at a point of 200 m forward from the vehicle. The information provider 110 may transmit the information on the front road to the transmission controller 130 in every specific period. Furthermore, the information provider 110 may directly transmit the information on the front road to the diagnosing device 140.

The information provider 110 may output (transmit) an operating status of hardware and a route status. The information provider 110 may determine whether internal hardware is normally operated, by use of a self-diagnosing solution. The information provider 110 may determine a route status by identifying a vehicle position based on a self-predicted route for example, a rout to a destination or Most Possible Path (MPP). The route status may be classified into an On Route status and an Off Route status. The On Route status refers to a status in which driving is performed along a route (that is, a predicted route) predicted by the information provider 110, the Off Route Status refers to a status in which the vehicle deviates from the predicted route of the information provider 110. The information provider 110 may output the information on the front road in every specific period only in the On Route Status and may not output the information on the front road in the Off Route Status. This is because the information on the front road in the Off Route Status is incorrect and not reliable.

The information provider 110 may include, although not illustrated in drawings, a memory to store map data, a Global Positioning System (GPS) receiver to measure a vehicle position, a communication circuit to receive traffic information from the outside, an output device (for example, a display and a speaker) to output directions and/or a processor to search for a driving route and provide information.

The detector 120 may receive a sensor signal (sensor data or a measurement value) output from various sensors, such as a vehicle speed sensor, a longitudinal acceleration sensor, and/or a lateral acceleration sensor, inside a vehicle. In other words, the detector 120 may detect longitudinal acceleration, lateral acceleration, and/or vehicle speed (vehicle speed) by use of sensors mounted in the vehicle. The detector 120 may detect a status of an ignition switch, an engine RPM, and/or the position of a gear shifting lever. The detector 120 may output, to the diagnosing device 140, the detected data such as the longitudinal acceleration, the lateral acceleration, and/or the vehicle speed.

The transmission controller 130 may control the operation of an automatic transmission (A/T) provided in the vehicle. The transmission controller 130 may operate in an automatic control mode or a prediction control mode. The transmission controller 130 may automatically control gear shifting by changing a speed stage (gear ratio) depending on the vehicle speed and the depressing degree of an accelerator pedal, when operating in the automatic control mode. The transmission controller 130 may perform the predictive gear-shifting controlling operation by utilizing the information on the front road, which is transmitted from the information provider 110, when operating in the prediction control mode. The transmission controller 130 may predict the condition of the front road, based on the information on the front road, that is, the moving distance per unit time, the slope of the front road, and/or the curvature of the front road. The transmission controller 130 may change the speed stage of the automatic transmission, based on the predicted condition of the front road. The transmission controller 130 may include a communication circuit, a memory, and a processor, although not illustrated in FIG. 1.

The diagnosing device 140 may diagnose whether the vehicular driving control system 100 is failed, by verifying the matching with the information on the front road, which is provided from the information provider 110. The diagnosing device 140 may allow or disapprove the predictive gear-shifting controlling operation of the transmission controller 130, based on the diagnosing result. The diagnosing device 140 may include a counter 141, a communication circuit 142, a memory 143, and a processor 155.

The counter 141 may count a failure count ($Counter_{Fail}$) of the vehicular driving control system 100. The counter 141 may be initialized ($Counter_{Fail}=0$) based on the instruction of the processor 144.

The communication circuit 142 may support the diagnosing device 140 such that the diagnosing device 140 may make communication with another device (for example, the information provider 110, the detector 120 and/or the transmission controller 130) inside the vehicle. Furthermore, the communication circuit 142 may support the communication between the diagnosing device 140 and an external electronic device. The communication circuit 142 may be integrally implemented in a single chip or may be separately implemented in a form of an individual chip.

The memory 143 may store a failure diagnosing algorithm and/or an algorithm of determining whether to perform a predictive gear shifting operation. The memory 143 may be a non-transitory storage medium to store instructions executed by the processor 144. The memory 143 may include a recoding medium such as a flash memory, a hard disk, a Solid State Disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), an embedded multimedia card, and/or a universal flash storage.

The processor 144 may control the overall operation of the diagnosing device 140. The processor 144 may be implemented with at least one of processing units of an Application Specific Integrated Circuit (ASIC), a Digital Signal Processor (DSP), Programmable Logic Devices (PLDs), Field Programmable Gate Arrays (FPGAs), a Central Processing unit (CPU), microcontrollers, or microprocessors.

The processor 144 may detect the failure of the vehicular driving control system 100 while the transmission controller 130 performs the predictive gear-shifting controlling operation. The processor 144 may determine whether an error is present in the information on the front road provided by the information provider 110, and may determine a failure status depending on the determination result.

The processor 144 may receive the information on the front road, which is transmitted from the information provider 110, through the transmission controller 130. The processor 144 may directly receive the information on the front road from the information provider 110. The diagnosing device 140 may predict information on a road positioned at a specific position spaced apart forward from the vehicle by a specific distance (for example, 200 m), based on the information on the front road, which is transmitted from the information provider 110. Furthermore, the diagnosing device 140 may obtain information (real road information) on the road measured at the specific position, based on sensor information obtained by the detector 120. The diagnosing device 140 may determine the information difference between the predicted information (that is, predicted front road information) on the front road and the real road information on the front road. The processor 144 may determine the failure as being caused, when the determined information difference is equal to or greater than a threshold value (a first threshold value) for determining failure.

The processor 144 may determine whether the detected failure is effective. The processor 144 may detect (determine) the failure when the information difference between the predicted front road information and the real road information is equal to or greater than the first threshold value. The processor 144 may diagnose (determine) the failure as valid failure, when the failure persists for a first reference time or more than the first reference time. In the instant case, the first reference time may be a reference time, that is, a valid failure time (valid failure determining reference time) for determining whether the detected failure is effective. The processor 144 may diagnose the valid failure only when being satisfied with all following conditions.

[Condition to Diagnose Valid Failure]
  A. Internal combustion engine start (ON): An ignition switch is on and the revolutions per minute (RPM) of the internal combustion engine speed exceeds 400 rpm
  B. A shift lever should be positioned in the D stage.
  C. The hardware operating status of the information provider 110 is normal.
  D. A route status should not be the Off route.
  F. The real vehicle speed Vs exceeds the reference vehicle speed, for example, 30 kph The processor 144 may instruct the transmission controller 130 to instantly stop the predictive gear-shifting controlling operation, when the valid failure is determined. In other words, the processor 144 may transmit, to the transmission controller 130, a signal (predictive gear-shifting blocking signal) for instructing the stopping (blocking) of the predictive gear-shifting controlling operation by setting the signal such that the signal is changed from '0' to '1'. Furthermore, the processor 144 may increase the failure count by operating the counter 141 whenever the valid failure is determined.

Furthermore, the processor 144 may determine (judge) a failure level based on the information difference between the predicted front road information and the real road information, and a time (persistence time) in which the status (the failure status) of the information difference equal to or greater than the first threshold value persists. The processor 144 may set an adding count variously depending on the failure level. The processor 144 may increase the counter 141 by the adding count matched with the failure level, whenever the failure level is determined. For example, when adding counts matched with level 1, level 2, level 3, and level 4 are '0.5', '1.0', '2.0', and '3.0', the processor 144 may increase the counter 141 by '0.5', when the failure level is level 1, and may increase the counter 141 by '2' when the failure level is level 3.

The processor 144 may stop the predictive gear-shifting controlling operation from a time point, at which failure is finally caused, till start off, when the failure count counted by the counter 141 reaches a preset threshold value (for example, 10). The processor 144 may determine the vehicular driving control system 100 as being in a normally returning status when the information difference between the predicted front road information and the real road information is equal to or less than a threshold value (normally returning determining threshold value; second threshold value) for determining normally returning, after the valid failure is caused. The processor 144 may finally determine the vehicular driving control system 100 as being normally returned when the normally returning status is maintained for a normally returning determining time (a second reference time) for determining normally returning or more. The processor 144 may transmit a signal for allowing that the predictive gear-shifting controlling operation is resumed, when the vehicular driving control system 100 is determined as being normally returned. In other words, the processor 144 may allow the transmission controller 130 to perform the predictive gear-shifting controlling operation, when the normally returning status is consecutively determined for the second reference time.

The processor 144 may set the second reference time variously based on the failure count. The second reference time may be increased, as the failure count is increased. The processor 144 may not withdraw the determined failure status until start off even if the vehicular driving control system 100 is normally returned, when the failure count exceeds a preset threshold value, for example, '10'.

Figure 2:
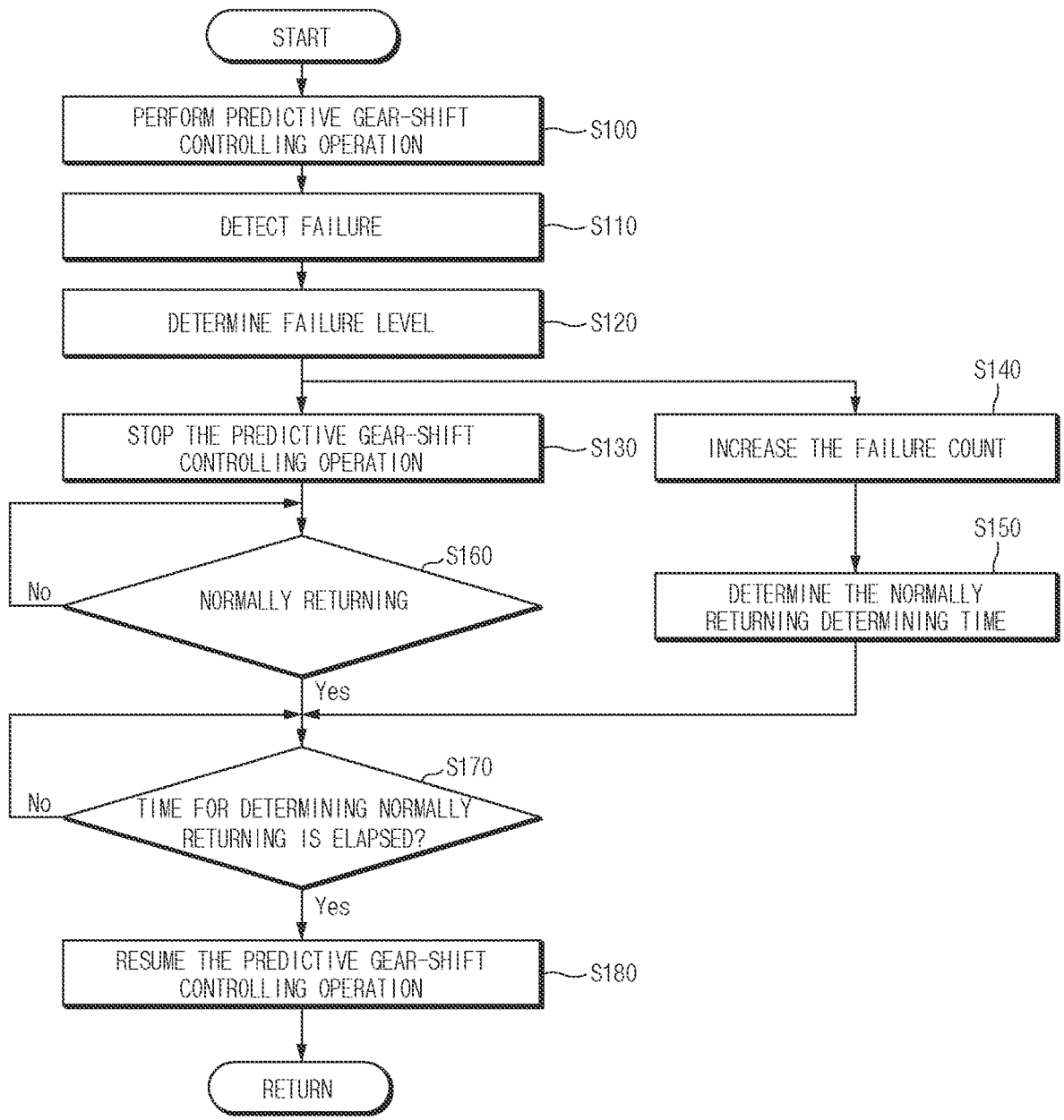
FIG. 2 is a flowchart illustrating a method for operating a vehicular driving control system, according to various exemplary embodiments of the present invention.

FIG. 2 is a flowchart illustrating a method for operating a vehicular driving control system, according to various exemplary embodiments of the present invention.

The transmission controller 130 may perform the predictive gear-shifting controlling operation based on the information on the front road, which is provided by the information provider 110 (S100). The information on the front road may include the moving distance per unit time, the slope of the front road, and/or the curvature of the front road.

The diagnosing device 140 may detect the failure by verifying the matching with the information on the front road, while the transmission controller 130 performs the predictive gear-shifting controlling operation (S110). The diagnosing device 140 may predict information on a road positioned at a specific position spaced apart forward from the vehicle by a specific distance (for example, 200 m), based on the information on the front road, which is transmitted from the information provider 110. Furthermore, the diagnosing device 140 may obtain real road information at the specific position based on the sensor information obtained by the detector 120. The diagnosing device 140 may determine the information difference between the predicted information (that is, predicted front road information) on the front road and the real road information. The diagnosing device 140 may determine whether the determined information difference is equal to or greater than a threshold value (the first threshold value) for determining failure. The diagnosing device 140 may detect (determine) the failure when the determined information difference is equal to or greater than the first threshold value. The diagnosing device 140 may determine the detected failure as the valid failure when the determination of the failure is maintained for the valid failure determination reference time (first reference time) or more.

The diagnosing device 140 may determine the failure level based on the determined information difference and the time in which the failure status persists (S120). The diagnosing device 140 may determine the failure level by making reference to a lookup table stored in the memory 143.

The diagnosing device 140 may stop the predictive gear-shifting controlling operation of the transmission controller 130, when the failure level is determined (S130). The diagnosing device 140 may output a signal (predictive gear-shifting blocking signal) for instructing the stopping (blocking) of the predictive gear-shifting controlling operation by setting the status of the signal to be changed from '0' to '1', when the failure level is determined. The transmission controller 130 may switch a gear shifting control mode from a prediction control mode to an automatic control mode, based on the predictive gear-shifting blocking signal.

The diagnosing device 140 may increase the failure count when the failure level is determined (S140). The diagnosing device 140 may increase the failure count by an adding count matched with the failure level whenever the failure level is determined. The diagnosing device 140 may maintain the failure status, until start off, when the failure count exceeds a preset threshold value.

The diagnosing device 140 may determine the normally returning determining time (second reference time) based on the failure count (S150). The normally returning determining time may be increased, as the failure count is increased.

The diagnosing device 140 may determine normally returning by comparing the predicted front road information with the real road information, after S130 (S160). The diagnosing device 140 may determine the vehicular driving control system 100 as being in the normally returning status, when the information difference between the predicted front road information and the real road information is equal to or less than the normally returning determining threshold value (second threshold value). The diagnosing device 140 may finally determine the vehicular driving control system 100 as being normally returned, when the normally returning status is maintained for the second threshold time or more.

The diagnosing device 140 may determine whether the time in which the normally returning status is maintained exceeds the normally returning determining time (second reference time), when the vehicular driving control system 100 is determined as being normally returned (S170).

When the time that the normally returning status is maintained exceeds the normally returning determining time, the diagnosing device 140 may allow (permit) the transmission controller 130 to resume the predictive gear-shifting controlling operation (S180). The diagnosing device 140 may set the predictive gear-shifting blocking signal to be changed from "1" to "0", when the normally returning is finally determined.

Figure 3:
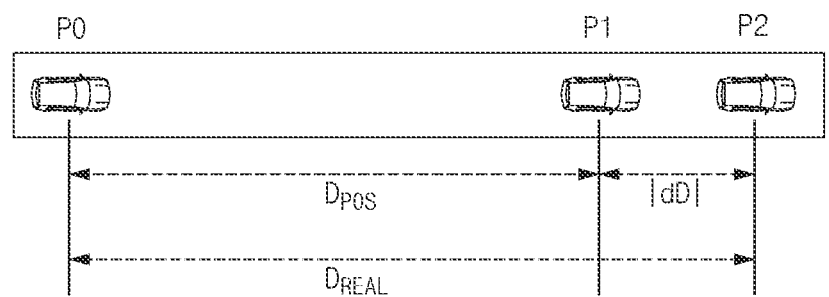
FIG. 3 and FIG. 4 are views exemplarily illustrating a method for diagnosing failure, according to various exemplary embodiments of the present invention.
Figure 4:
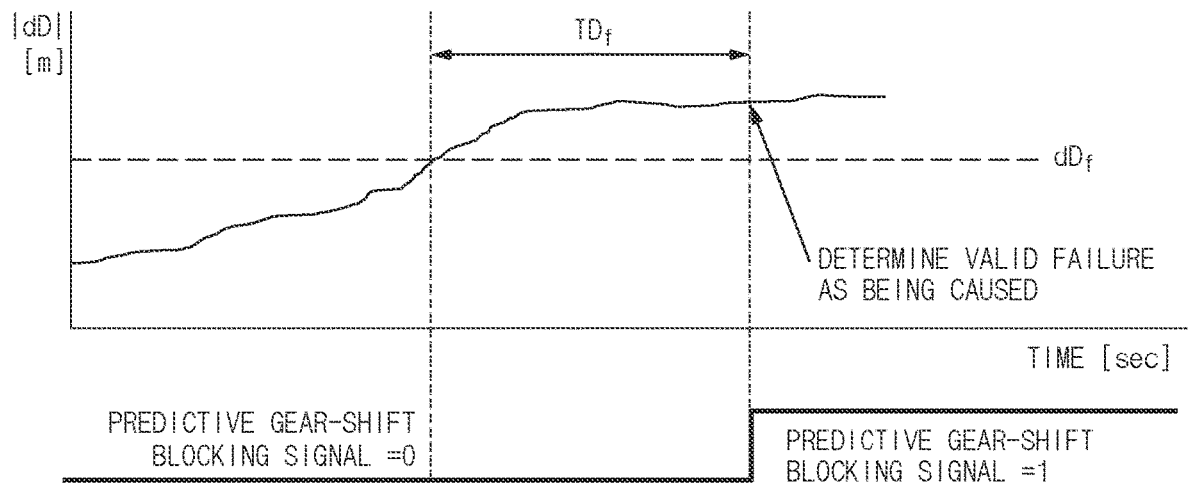

FIG. 3 and FIG. 4 are views exemplarily illustrating a method for diagnosing a failure, according to various exemplary embodiments of the present invention.

Referring to FIG. 3, in the status in which a vehicle is positioned at a position "P0", the diagnosing device 140 may predict a vehicle position as a position "P1", when a reference time (for example, 10 seconds) for diagnosing is elapsed, based on the moving distance per unit time, which is output from the information provider 110. In other words, the diagnosing device 140 may determine the moving distance (that is, a predicted moving distance ($D_{POS}$)) of the vehicle, which is predicted for the diagnosing reference time, by use of information on the moving distance per unit time. Although the diagnosing device 140 determines the predicted moving distance by way of example according to the exemplary embodiment of the present invention, the information provider 110 may determine the predicted moving distance and may provide the predicted moving distance to the diagnosing device 140.

Furthermore, the diagnosing device 140 may measure a real vehicle position "P2" through a vehicle sensor when the diagnosing reference time is elapsed. In other words, the diagnosing device 140 may compute (determine) a real moving distance ($D_{REAL}$) of the vehicle, based on the vehicle speed measured by the vehicle sensor.

The diagnosing device 140 may determine the difference (|dD|) between the predicted moving distance ($D_{POS}$) and the real moving distance ($D_{REAL}$) through Equation 1.

$$|dD|=|D_{POS}-D_{REAL}| \quad \text{Equation 1}$$

Referring to FIG. 4, the diagnosing device 140 may detect the valid failure as being caused, when the status in which the determined difference (|dD|) is equal to or greater than a failure determining threshold value ($dD_f$) is maintained (continues) for an valid failure time ($TD_f$) or more. In other words, the diagnosing device 140 may determine the valid failure as being caused, when the difference between the predicted moving distance ($D_{POS}$) and the real moving distance ($D_{REAL}$) is maintained to the failure determining threshold value ($dD_f$) or more for the valid failure time ($TD_f$).

The diagnosing device 140 may set a control signal (that is, a predictive gear-shifting blocking signal) for instructing the stopping (blocking) of the predictive gear-shifting controlling operation such that the status of the predictive gear-shifting blocking signal is changed from "0" to "1", when the normally returning is finally determined. Furthermore, the diagnosing device 140 may increase the failure count ($Counter_{POS\_FAIL}$), when the valid failure is determined.

Figure 5:
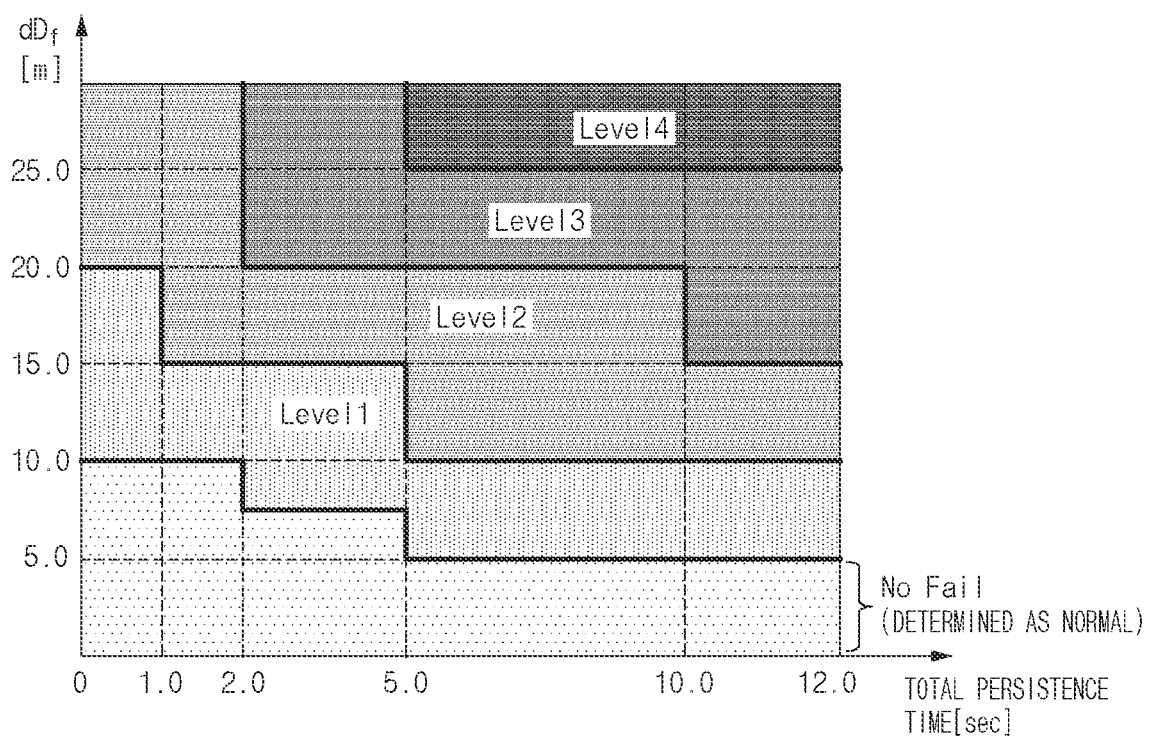
FIG. 5 is a view exemplarily illustrating a method for controlling gear shifting depending on a failure level, according to various exemplary embodiments of the present invention.

FIG. 5 is a view exemplarily illustrating a method for controlling gear shifting, depending on a failure level, according to various exemplary embodiments of the present invention.

The diagnosing device 140 may determine the failure count, based on the difference (|dD|) between the predicted moving distance ($D_{POS}$) and the real moving distance ($D_{REAL}$) and a time (total persistence time) in which the difference (|dD|) persists.

The diagnosing device 140 may instantly stop the predictive gear-shifting controlling operation of the transmission controller 130 regardless of the failure level, when the failure is determined as being caused. In the instant case, the transmission controller 130 may return the gear shifting control mode from the prediction control mode to the automatic control mode, when receiving an instruction to stop the predictive gear-shifting controlling operation from the diagnosing device 140.

The diagnosing device 140 may increase the failure count whenever the failure is determined as being caused. The diagnosing device 140 may set the adding count depending on the failure level, and may increase the failure count ($Counter_{POS\_FIAL}$) by the set adding count.

The diagnosing device 140 may make determination to disapprove (block) the predictive gear-shifting controlling operation from a time point, at which a failure is finally caused, till start off, when the failure count reaches a preset threshold value. Accordingly, the transmission controller 130 may stop the predictive gear-shifting controlling operation, based on a control command of the diagnosing device 140.

Figure 6:
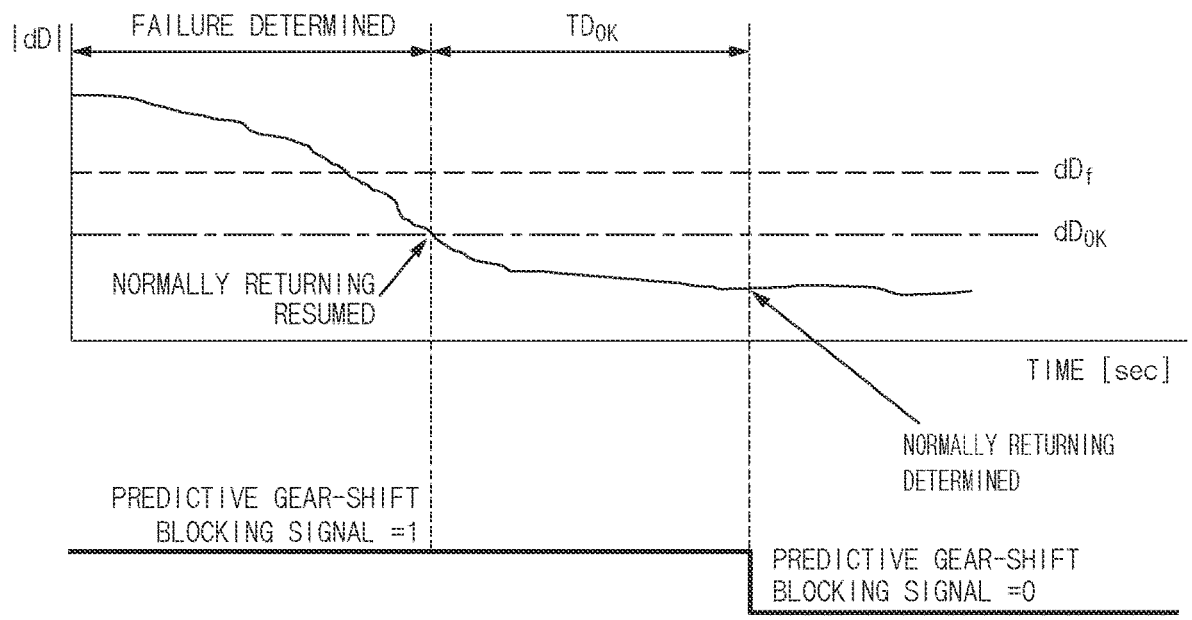
FIG. 6 is a view exemplarily illustrating a method for determining normally returning, according to various exemplary embodiments of the present invention.

FIG. 6 is a view exemplarily illustrating a method for determining normally returning, according to various exemplary embodiments of the present invention.

The diagnosing device 140 may determine the vehicular driving control system 100 as being normally returned, when the status in which the difference (|dD|) between the predicted moving distance ($D_{POS}$) and the real moving distance ($D_{REAL}$) is equal to or less than the normally returning determining threshold value ($dD_{OK}$) is maintained for a normal status determining time ($TD_{OK}$) or more, after the valid failure is determined as being caused. In more detail, the diagnosing device 140 may determine the normally returning status as being resumed, when the difference (|dD|) between the predicted moving distance ($D_{POS}$) and the real moving distance ($D_{REAL}$) is changed to the normally returning determining threshold value ($dD_{OK}$) or less, in the status that the failure is determined as being caused. The diagnosing device 140 may finally determine the vehicular driving control system 100 as being normally returned, when the normally returning status, in which the difference (|dD|) between the predicted moving distance ($D_{POS}$) and the real moving distance ($D_{REAL}$) is equal to or less than the normally returning determining threshold value ($dD_{OK}$), is maintained for the normal status determining time ($TD_{OK}$) or more. The diagnosing device 140 may set the predictive gear-shifting blocking signal to be changed from '1' to '0' and may transmit the predictive gear-shifting blocking signal to the transmission controller 130, when the normally returning status is determined. In other words, the diagnosing device 140 may allow the transmission controller 130 to resume the predictive gear-shifting controlling operation when the normally returning status is consecutively determined for the normal status determining time ($TD_{OK}$).

Figure 7:
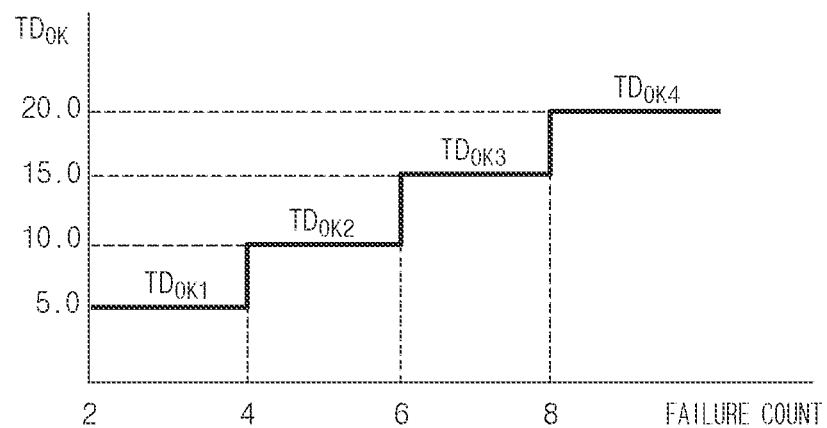
FIG. 7 is a view exemplarily illustrating a method for determining normally returning based on a failure count, according to various exemplary embodiments of the present invention.

FIG. 7 is a view exemplarily illustrating a method for determining normally returning depending on a failure count, according to various exemplary embodiments of the present invention.

The diagnosing device 140 may set a time (that is, normally returning determining time) for determining the normally returning status, variably depending on the failure count. The normally returning determining time is increased, as the failure count is increased. The diagnosing device 140 may not withdraw the determined failure status until start off, even if the vehicular driving control system 100 is normally maintained, when the total failure counts read out of the counter 141 exceed ten. In other words, the diagnosing device 140 may restrict the predictive gear-shifting controlling operation until start off, even if the information on the front road, which is output from the information provider 110, is reliable and normally maintained, when the failure count exceeds the preset threshold value.

Figure 8:
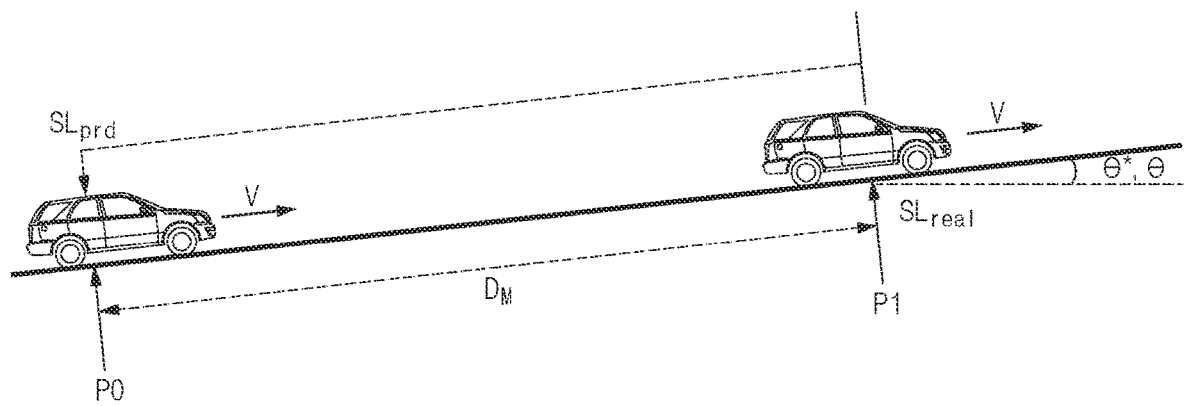
FIG. 8 is a view exemplarily illustrating a method for diagnosing failure, according to various exemplary embodiments of the present invention.

FIG. 8 is a view exemplarily illustrating a method for diagnosing a failure, according to various exemplary embodiments of the present invention.

The information provider 110 may predict a road slope ($SL_{prd}$=tan θ*[%]) at a specific position "P1" spaced apart forward from a position "P0" by a specific distance ($D_M$), when the vehicle is positioned at the position "P0". The information provider 110 may transmit a predicted front road slope (predicted road slope) ($SL_{prd}$=tan θ [%]) to the diagnosing device 140.

The detector 120 may measure a longitudinal acceleration by use of the longitudinal acceleration sensor, when the vehicle actually passes through the specific position "P1".

The diagnosing device 140 may determine (measure) a real road slope ($SL_{real}$) based on the longitudinal acceleration output from the detector 120.

The diagnosing device 140 may determine a slope difference (|dSL|) between the predicted road slope ($SL_{prd}$) obtained from the information provider 110 and the real road slope ($SL_{real}$). The slope difference (|dSL|) may be expressed as in Equation 2.

$$|dSL|=|SL_{prd}-SL_{real}| \qquad \text{Equation 2}$$

The diagnosing device 140 may determine failure as being caused (failure status), when the slope difference (|dSL|) is equal to or greater than a failure determining threshold value ($dSL_f$). The diagnosing device 140 may determine the valid failure as being caused when the failure status persists for a valid failure time ($TSL_f$) or more.

The diagnosing device 140 may output the predictive gear-shifting blocking signal for instructing the stopping (blocking) of the predictive gear-shifting controlling operation by setting the predictive gear-shifting blocking signal to be changed from '0' to '1', when the valid failure is determined as being caused. The diagnosing device 140 may instruct the stopping of a slope-related function together. Furthermore, the electronic device may increase the failure count ($Counter_{SL\_FAIL}$) by operating the counter 141.

Figure 9:
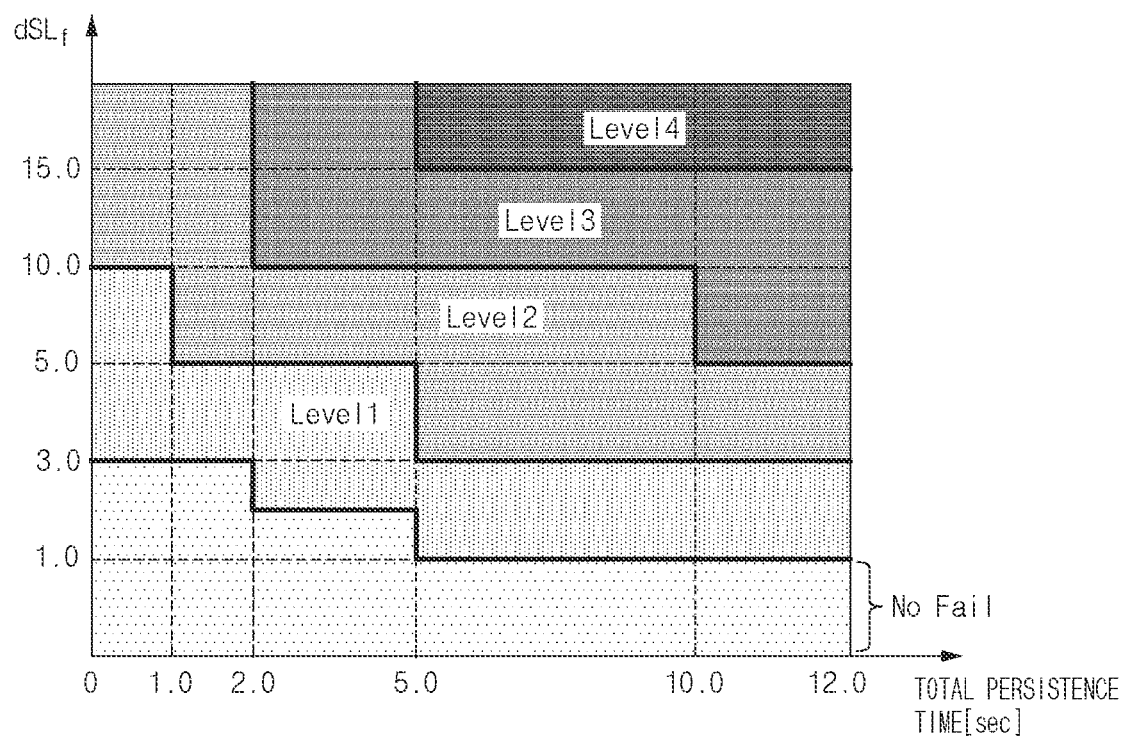
FIG. 9 is a view exemplarily illustrating a method for controlling gear shifting, depending on a failure level, according to various exemplary embodiments of the present invention.

FIG. 9 is a view exemplarily illustrating a method for controlling gear shifting, depending on a failure level, according to various exemplary embodiments of the present invention.

The diagnosing device 140 may determine the failure level by making reference to graph illustrated in FIG. 9 when failure is caused. The diagnosing device 140 may determine the failure level based on the slope difference (|dSL|) and/or the persistence time in which the failure status persists.

The diagnosing device 140 may instruct the transmission controller 130 to instantly stop the predictive gear-shifting controlling operation related to the slope, regardless of the failure level, when the failure is determined. The diagnosing device 140 may increase the failure count ($Counter_{SL\_FIAL}$) based on the adding count corresponding to the determined failure level, when the failure is determined. The adding count may be set to be greater, as the failure level is increased.

The diagnosing device 140 may stop the predictive gear-shifting controlling operation from a time point in which a failure is finally caused, start off, when the total failure counts reach a preset threshold value (for example, 10).

Figure 10:
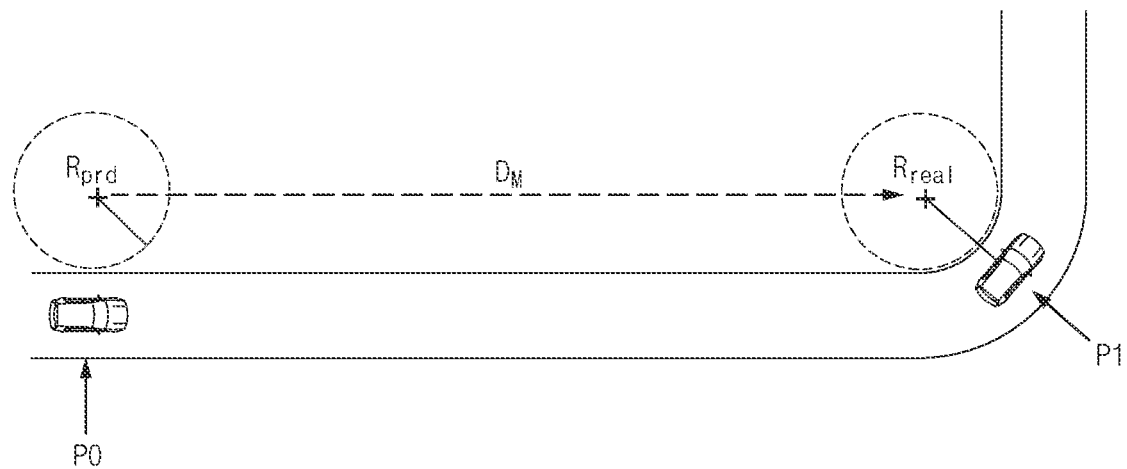
FIG. 10 is a view exemplarily illustrating a method for diagnosing failure, according to various exemplary embodiments of the present invention.

FIG. 10 is a view exemplarily illustrating a method for diagnosing failure, according to various exemplary embodiments of the present invention.

The information provider 110 may predict a curvature ($R_{prd}$) of a front road at the position "P1" spaced apart forward from the position "P0" by the specific distance ($D_M$) when the vehicle is positioned at the position "P0". The detector 120 may measure the curvature of the road at the position "P1" by use of a lateral acceleration sensor at a time point at which the vehicle passes through the position "P1". The diagnosing device 140 may determine a real road curvature ($R_{real}$) based on a lateral acceleration ($G_y$) measured by the lateral acceleration sensor. The real road curvature ($R_{real}$) may be expressed as in Equation 3.

$$R_{real} = \frac{v^2}{G_y} \qquad \text{Equation 3}$$

In the instant case, v(m/sec2)=0.278V(km/h), and "v" denotes a vehicle speed.

The diagnosing device 140 may determine the difference ORD between the predicted road curvature ($R_{prd}$) and the real road curvature ($R_{real}$) through following Equation 4.

$$|dR|=|R_{prd}-R_{real}|$$ Equation 4

The diagnosing device 140 may diagnose the matching with predicted front road curvature information provided by the information provider 110, based on the curvature difference ORD between the predicted road curvature ($R_{prd}$) and the real road curvature ($R_{real}$). In other words, the diagnosing device 140 may diagnose whether the predicted front road curvature information is reliable. The diagnosing device 140 may determine the failure as being caused, when the curvature difference ORD is equal to or greater than a failure determining threshold value ($dR_f$). The diagnosing device 140 may determine the failure as the valid failure, when the failure status persists for the valid failure time ($TR_f$) or more.

The diagnosing device 140 may instruct the transmission controller 130 to stop a predictive gear-shifting controlling operation related to a curvature, when the valid failure is determined as being caused. Furthermore, the diagnosing device 140 may instantly stop a curvature-related function. The diagnosing device 140 may increase the failure count ($Counter_{R\_FIAL}$) whenever the valid failure is determined as being caused.

Figure 11:
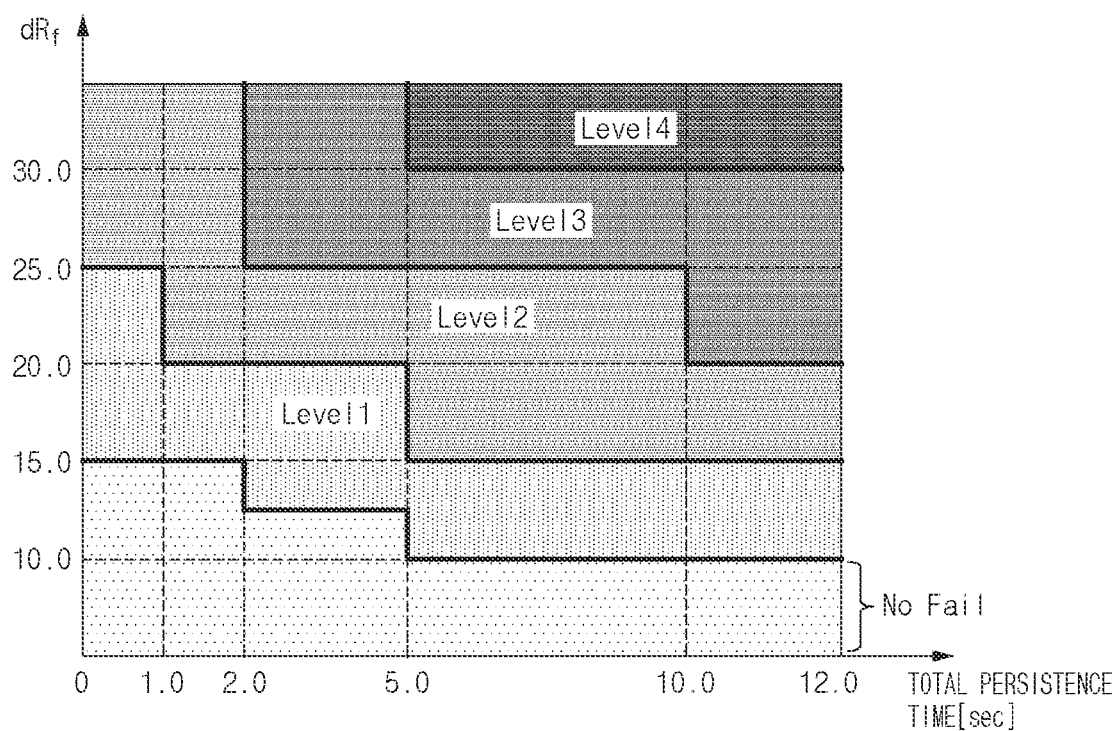
FIG. 11 is a view exemplarily illustrating a method for controlling gear shifting, depending on a failure level, according to various exemplary embodiments of the present invention.

FIG. 11 is a view exemplarily illustrating a method for controlling gear shifting, depending on a failure level, according to various exemplary embodiments of the present invention.

The diagnosing device 140 may determine a failure level by making reference to graph illustrated in FIG. 11, when the failure is caused. The diagnosing device 140 may determine the failure level, based on the curvature difference ORD and a persistence time in which the failure status persists.

The diagnosing device 140 may instruct the transmission controller 130 to stop a predictive gear-shifting controlling operation related to a curvature regardless of the failure level, when the failure is determined as being caused. Furthermore, the diagnosing device 140 may increase the failure count ($Counter_{R\_FIAL}$) whenever the failure level is determined. The diagnosing device 140 may increase the failure count based on the adding count set to be changed depending on the failure level determined when the failure count is increased.

The diagnosing device 140 may instruct the stopping of the predictive gear-shifting controlling operation from a time point, at which a failure is finally caused, till start off, when the failure count reaches a preset threshold value.

Figure 12:
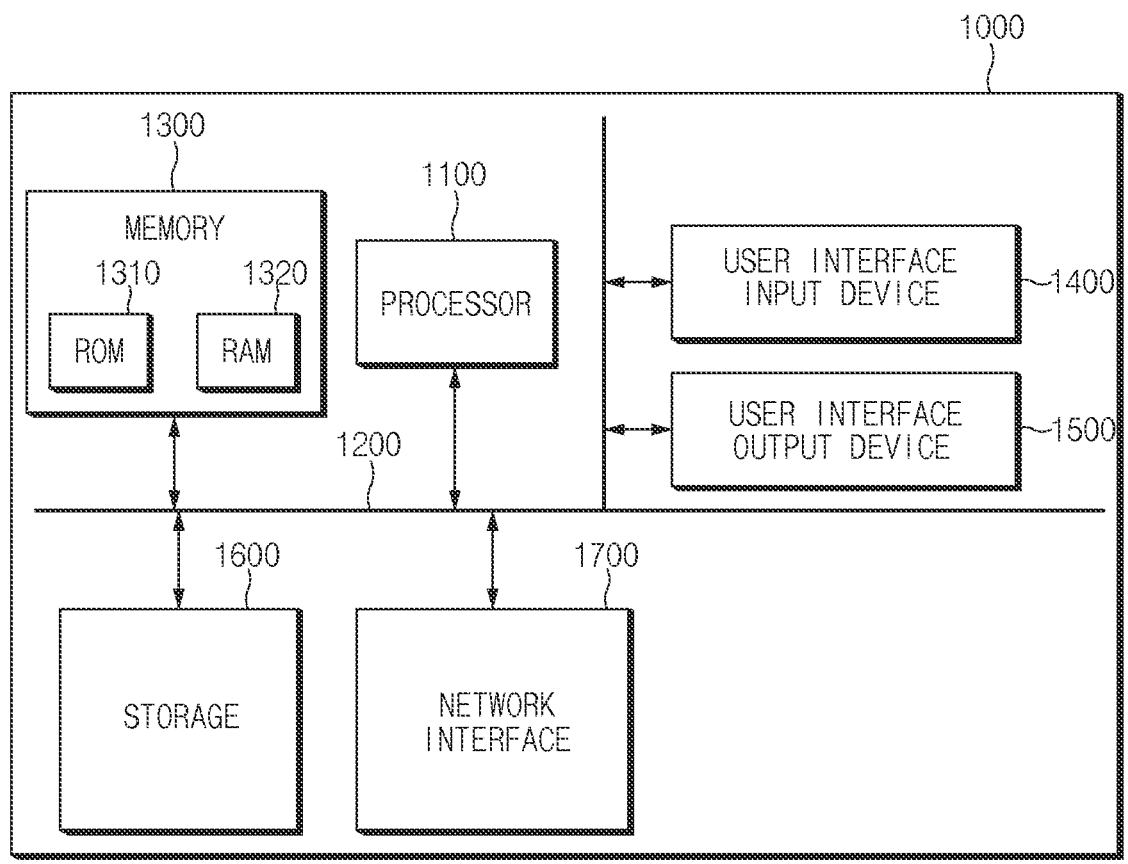
FIG. 12 is a block diagram illustrating a determining system to execute the method for operating the vehicular driving control system, according to exemplary embodiments of the present invention.

FIG. 12 is a block diagram illustrating a computing system to execute the method for operating the vehicular driving control system, according to exemplary embodiments of the present invention.

Referring to FIG. 12, a computing system 1000 may include at least one processor 1100, a memory 1300, a user interface input device 1400, a user interface output device 1500, a storage 1600, and a network interface 1700, which are connected to each other via a system bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM; see reference numeral 1310) and a random access memory (RAM; see reference numeral 1320).

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor 1100 and storage medium may reside in an application specific integrated circuit (ASIC). The ASIC may reside in a user terminal. Alternatively, the processor 1100 and the storage medium may reside as separate components of the terminal of the user.

According to various exemplary embodiments of the present invention, the matching with information provided from an information provider may be verified when the predictive gear-shifting controlling operation is performed through the linkage with the information provider. Accordingly, the predictive gear-shifting controlling operation may be performed in the situation that the reliability is ensured to a specific level or more.

Furthermore, according to various exemplary embodiments of the present invention, when the reliability of information provided by the information provider is in less than the specific level to be insufficient, the predictive gear-shifting controlling operation may be temporarily stopped.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicular driving control system comprising:
    an information provider configured to provide information on a front road of a vehicle;

a transmission controller configured to control gear shifting of the vehicle by predicting a condition on the front road, according to the information on the front road; and a diagnosing device configured to:
   diagnose a failure status by comparing the information on the front road with real front road information measured by a sensor, wherein diagnosing the failure status includes determining failure as being caused;
   restrict a predictive gear-shifting controlling operation of the transmission controller, according to the diagnosing of the failure status,
wherein the diagnosing of the failure status further includes:
   determining an information difference between predicted front road information based on the information on the front road and the real front road information measured by the sensor;
   determining a failure status as being caused when the information difference is equal to or greater than a first threshold value;
   determining a failure level when the failure status has been determined as being caused;
   wherein the failure level is determined from a plurality of failure level options, and each of the plurality of failure level options is matched with an adding count that is non-zero and different from the adding counts matched with the other failure level options,
   setting the adding count depending on the failure level; and
   increasing a failure count based on by adding the adding count whenever the failure level is determined.

2. The vehicular driving control system of claim 1, wherein the information on the front road includes:
   at least one of a moving distance per unit time, a slope of the front road, and a curvature of the front road.

3. The vehicular driving control system of claim 1, wherein the diagnosing device is further configured to:
   determine valid failure as being caused, when the failure status persists for a first reference time or more than the first reference time.

4. The vehicular driving control system of claim 3, wherein the diagnosing device is further configured to instruct the transmission controller to stop the predictive gear-shifting controlling operation, when the valid failure is determined as being caused.

5. The vehicular driving control system of claim 1, wherein the sensor includes at least one of a vehicle sensor, a longitudinal acceleration sensor, and a lateral acceleration sensor.

6. The vehicular driving control system of claim 1, wherein the diagnosing device is further configured to determine the failure level according to the information difference and a time in which the failure status persists.

7. The vehicular driving control system of claim 6, wherein the diagnosing device is further configured to determine the predictive gear-shifting controlling operation to stop during a period from a time point, at which failure is finally caused, till start off, when the failure count reaches a preset threshold value.

8. The vehicular driving control system of claim 1, wherein the diagnosing device is further configured to:
   determine the vehicular driving control system as being in a normally returning status when the information difference is equal to or less than a second threshold value;
   determine the vehicular driving control system as being normally returned when the normally returning status maintains for a second reference time or more than the second reference time; and
   determines that the predictive gear-shifting controlling operation is allowed to be resumed, when the vehicular driving control system is determined as being normally returned.

9. The vehicular driving control system of claim 8, wherein the second reference time is set based on the failure count.

10. The method of claim 9, wherein the diagnosing of the failure status further includes:
   determining the failure level according to the information difference and a time in which the failure status persists.

11. The method of claim 10, wherein the diagnosing of the failure status includes:
   determining a time for determining returning, based on the failure count.

12. The method of claim 9, further including:
   determining the vehicular driving control system as being in a normally returning status when the information difference is equal to or greater than a second threshold value after a failure is diagnosed; and
   determining the vehicular driving control system as being normally returned when the normally returning status maintains for a second reference time or more than the second reference time.

13. The method of claim 12, further including:
   determining that the predictive gear-shifting controlling operation is allowed to be resumed, when the vehicular driving control system is determined as being normally returned.

14. A method for operating a vehicular driving control system, the method comprising:
   controlling, by a transmission controller, gear shifting by predicting a condition on a front road according to information on the front road, which is provided from an information provider;
   diagnosing, by a diagnosing device, a failure status by comparing the information on the front road with real front road information measured by a sensor, wherein diagnosing the failure status includes determining failure as being caused;
   restricting, by the diagnosing device, a predictive gear-shifting controlling operation of the transmission controller, according to the diagnosing of the failure status,
wherein the diagnosing of the failure status further includes:
   determining, an information difference between predicted front road information based on the information on the front road and the real front road information measured by the sensor;
   determining, a failure status as being caused when the information difference is equal to or greater than a first threshold value;
   determining a failure level when the failure status has been determined as being caused,
   wherein the failure level is determined from a plurality of failure level options, and each of the plurality of failure level options is matched with an adding count that is non-zero and different from the adding counts matched with the other failure level options;
   setting the adding count depending on the failure level; and increasing a failure count by adding the adding count when a valid failure is determined.

15. The method of claim 14, wherein the information on the front road includes:
at least one of a moving distance per unit time, a slope of the front road, and a curvature of the front road.

16. The method of claim 14, wherein the diagnosing of the failure status includes:
determining the valid failure as being caused, when the failure status persists for a first reference time or more than the first reference time.

17. The method of claim 14, wherein the restricting of the predictive gear-shifting controlling operation includes:
instructing the transmission controller to stop the predictive gear-shifting controlling operation when a failure is diagnosed; and
allowing the transmission controller to switch a gear shifting control mode from a prediction control mode to an automatic control mode.

* * * * *